United States Patent [19]

Pott et al.

[11] 4,112,195

[45] Sep. 5, 1978

[54] LAMINABLE CONVERTIBLE MOLDING FOR HAND RAILS AND THE LIKE

[76] Inventors: Ronald W. Pott, 730 Crescent Lane, Lakewood, Colo. 80215; William G. Grimm, 29974 Paintbrush Dr., Evergreen, Colo. 80439

[21] Appl. No.: 718,963

[22] Filed: Aug. 30, 1976

[51] Int. Cl.² .......................... B32B 3/00; B32B 9/04
[52] U.S. Cl. ................................. 428/542; 428/167; 428/156; 428/174
[58] Field of Search ................. 428/57, 156, 174, 542, 428/167, 172; 256/59, 65; 403/97, 267, 341, 380; 287/30, 924, 128, DIG. 2

[56] References Cited

U.S. PATENT DOCUMENTS

| | | | |
|---|---|---|---|
| 3,289,381 | 12/1966 | Blum et al. | 52/730 |
| 3,356,392 | 12/1967 | Blum et al. | 403/380 |
| 3,482,819 | 12/1969 | Leurent | 256/59 |
| 3,804,374 | 4/1974 | Thom | 256/59 |

Primary Examiner—Marion E. McCamish
Assistant Examiner—P. J. Thibodeau
Attorney, Agent, or Firm—John E. Reilly; James R. Young

[57] ABSTRACT

A composite molding structure combines a plurality of laminated body members with matingly engageable channels and extensions sized and shaped to at least partially interfittingly retain said body members from movement relative to one another, and filling and finishing members are so constructed and arranged as to conceal said channels and extensions whereby to impart a finished, contoured appearance and feel. The body members also include a variety of distinctive architectural configurations on their lateral sides which serve both as functional gripping surfaces as well as to impart an ornamental appearance to the finished molding. The various shapes and configurations with corresponding engagement means are conducive to the exercise of one's individual creativity in laminating various members together in a variety of combinations to produce finished moldings, handrails, balustrades and the like of desired size and appearance.

12 Claims, 8 Drawing Figures

U.S. Patent  Sept. 5, 1978  Sheet 1 of 2  4,112,195
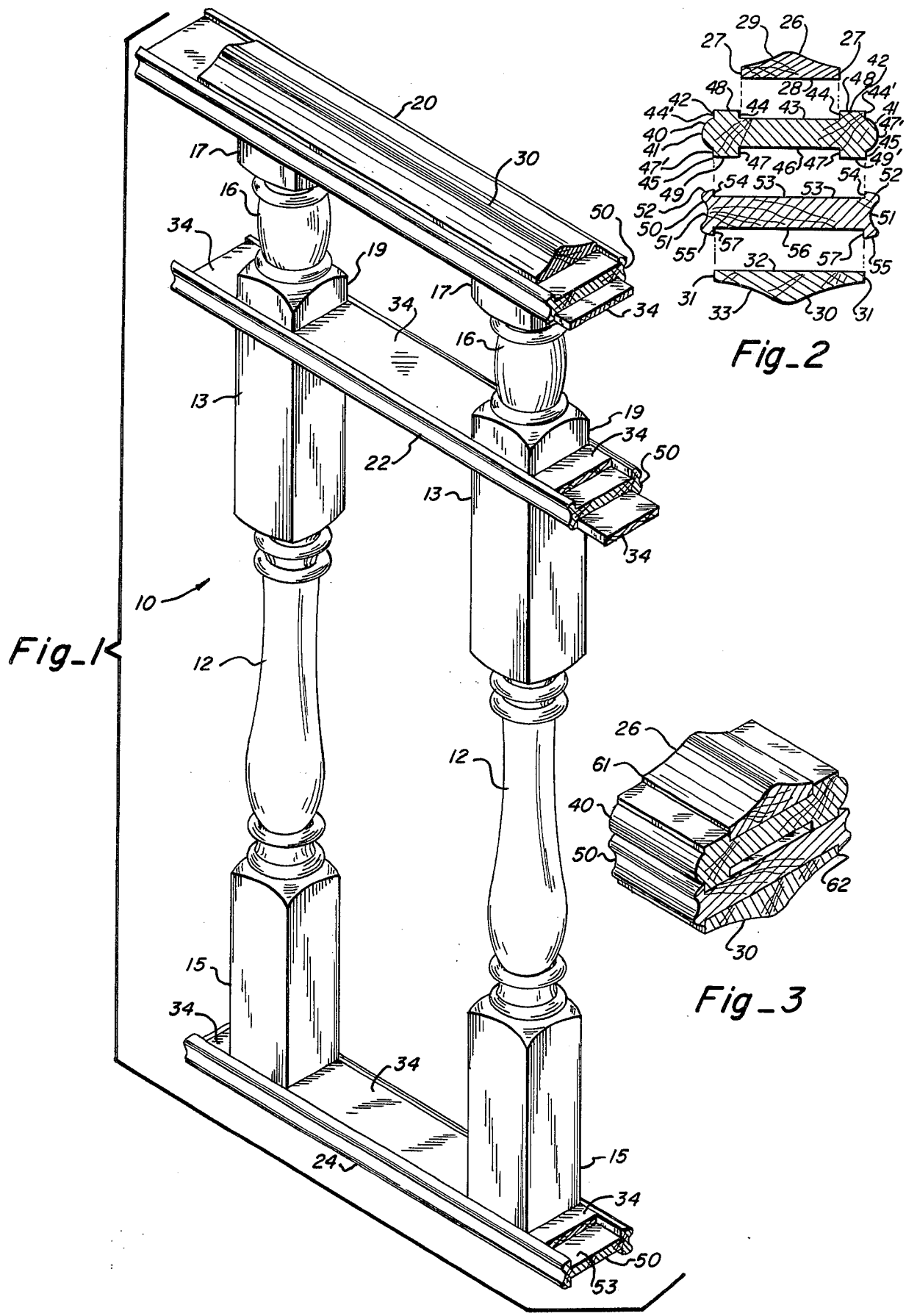

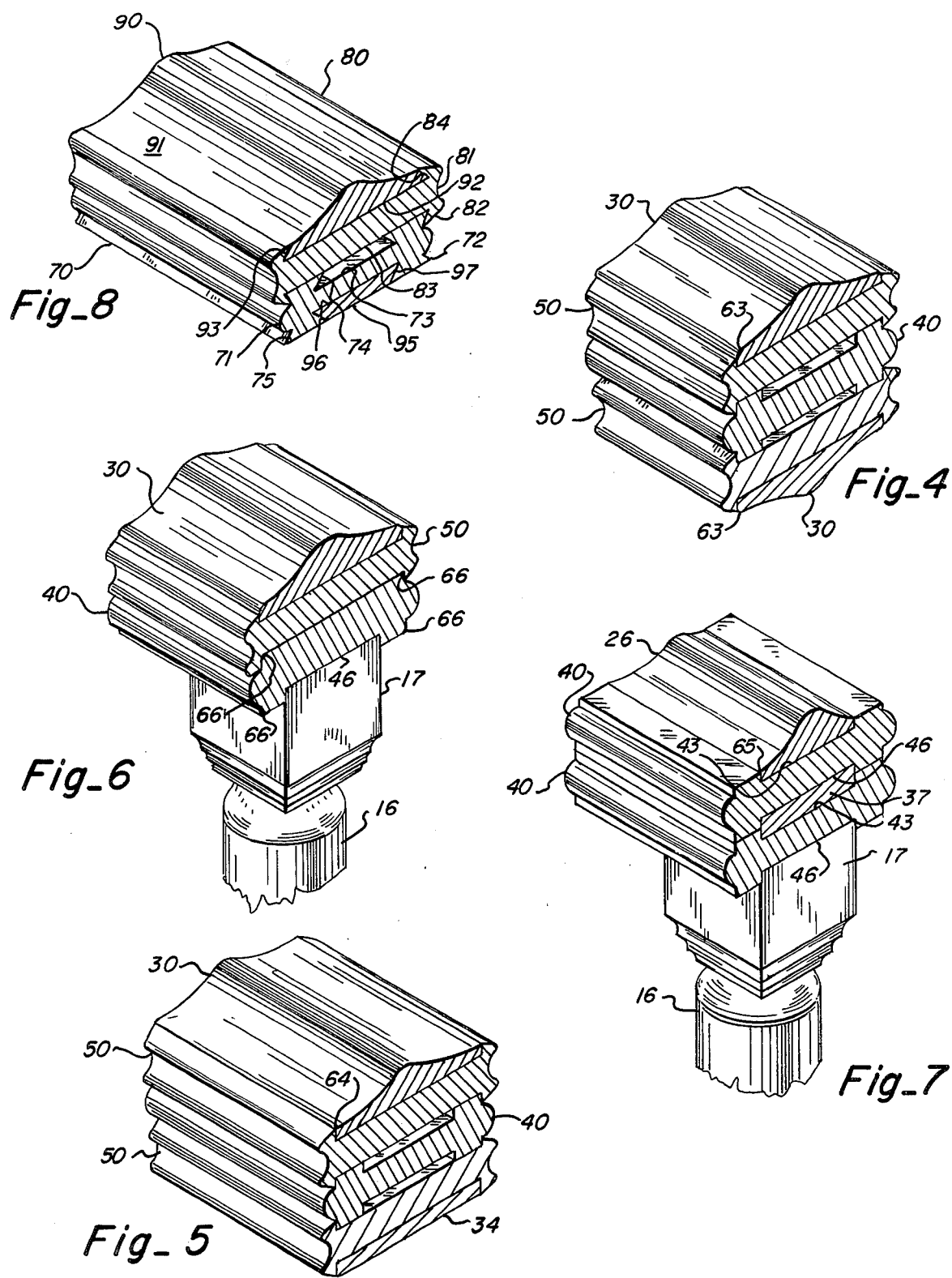

LAMINABLE CONVERTIBLE MOLDING FOR HAND RAILS AND THE LIKE

BACKGROUND OF THE INVENTION

This invention relates generally to moldings, and particularly to a composite, convertible, laminable molding for use as railings, balustrades, parapets and other decorative as well as functional uses.

Decorative moldings have been used throughout the ages for various functional as well as decorative purposes, such as for railings, balustrades, parapets and other applications where they have been considered particularly appropriate and pleasing in appearance. In fact, the use of decorative moldings has been so wide and varied that the sizes, shapes, appearances of the moldings used have been numerous and limited only by the imagination of their creators. In the past, these moldings have been carved from wood in sizes and configurations according to the requirements of the user and in more recent times mass-produced in particular configurations and sizes for use by those whose tastes may coincide with the manufacturer's.

In recent years, developments have also been made in convenient metallic structures for railings, composite railings with wood and metal parts, as well as specific developments directed to methods and apparatus for attaching moldings to brackets such as for use in safety railings for stairwells. U.S. Pat. No. 3,482,819, issued to G. Laurent, shows stairway railings and the like which are fabricated from interlocking extruded metallic channel members. Elongated pairs of U-shaped elements are arranged to interlock on a slide-on or clip-on type of arrangement to form upper and lower railings. Balustrades are interconnected via tongue-and-groove attachments, and a cover cap is also snapped or slide-connected to the top. U.S. Pat. No. 3,289,381, issued to L. Blum et al, discloses an elongated wood member which is tongue-and-groove attached to an elongated mating metallic base member with screws being used to retain the sandwiched assembly. U.S. Pat. No. 3,804,374, issued to W. Thom, is of interest to the extent of its disclosure of an elongated rail cap which is tongue-and-groove attached to retaining posts. U.S. Pat. Nos. 3,356,392, issued to L. Blum et al, and 3,358,869, issued to E. W. Palmer et al are of general interest for their disclosure of plug-in type end caps for use with tubing or laminated railing structures.

Although these prior art patents are of interest and are probably successful for the particular purposes for which they were designed, it has been found desirable to advance beyond the moldings heretofore known and used and to develop molding structures comprised of a plurality of individual components which can be mass-produced and then assembled with some latitude in creativity by professionals and novices alike in constructing moldings for selective functional as well as aesthetic purposes.

SUMMARY OF THE INVENTION

Accordingly, it is an object of the present invention to provide standard, interengageable, elongated molding members which can be selectively mated together in laminar fashion and unified into desired thickness and design for use in assembling railings, balustrades, parapets and the like.

It is another object of the present invention to provide convertible or interchangeable members with different characteristics and appearances but with interfitting parts so that said members can be interfittingly laminated together in a variety of combinations to construct moldings with individually desired characteristics of size, shape, and appearance.

It is also an object of the present invention to provide a composite molding structure comprised of individual members with mating engagement means to provide structural rigidity and finishing members for concealing the engagement means to provide an integrated appearance.

It is a further object of the present invention to provide individual members of a composite molding structure, identical members of which can be laminated together to achieve the desired size and appearance together with an interfitting key fillet member for providing structural rigidity to the finished molding.

It is a still further object of the present invention to provide individual components which can be laminated together to be interchangeably used to develop a finished molding of desired size with finishing cap members not only to conceal the interfitting means but also to provide a contoured surface for a comfortable fit and feel as well as effective grasp by a person's hand.

The present invention includes a plurality of elongated structural members with matingly engageable interfitting means and with ornamental as well as functional configurations which can be laminated together in a variety of combinations to build up composite molding structures of desired sizes and shapes. Interfitting or mating means are comprised primarily of strategically sized and located mating channels and elongated, rectilinear tongues or ribs, as well as fillets and cap members with contoured surfaces to impart a finished appearance and feel. The elongated rectilinear ribs are dimensioned and sized to snugly fit within correspondingly sized and shaped mating channels of adjacent laminated members to provide structural rigidity to the finished molding.

The individual molding members are thus conveniently designed for use by amateurs as well as professionals in constructing composite moldings, and the various configurations with mating interfitting means are conducive to allowing one to exercise his creativity in interchangeably utilizing different individual members in constructing composite moldings of a variety of sizes and configurations according to individual tastes and needs.

BRIEF DESCRIPTION OF THE DRAWINGS

Other objects, advantages and capabilities of the present invention will become more apparent as the description proceeds, taken in conjunction with the accompanying drawings, in which:

FIG. 1 is a perspective view of a balustrade comprised of railings assembled in accordance with the present invention and supported by balusters;

FIG. 2 is an exploded, cross-sectional view of the principal structural members of the present invention;

FIG. 3 is a perspective view of a segment of a composite molding comprised of a combination of structural members in accordance with the present invention;

FIG. 4 is a perspective view of the structural members laminated together in a variation to form a different molding configuration;

FIG. 5 is a perspective view of the structural members laminated together in still another variation with a fillet member in the bottom for a finished appearance;

FIG. 6 illustrates another combination in which the different structural members and caps can be arranged in combination with a baluster;

FIG. 7 shows still another variation in which identical structural members are laminated together and interfitted with a fillet key member, and also showing the upper end of a baluster engaged in the interfitting means of a structural member; and FIG. 8 is a perspective view of a segment of the structural members laminated together in still another variation, and also showing an alternate embodiment of the interfitting means.

DETAILED DESCRIPTION OF THE PREFERRED EMBODIMENT

A balustrade 10 with moldings or railings 20, 22, and 24 constructed in accordance with the present invention and supported by balusters 12 and 16 is shown in FIG. 1. The present invention is directed to convertible or interchangeable elements can be laminated together in different combinations into a variety of desirable sizes and configurations such as those shown in FIG. 1 at 20, 22, and 24. The elements are preferably fabricated from wood, although other materials such as metal would also be suitable in some applications.

The cross-sectional forms of the principal structural members can best be seen in FIG. 2 wherein a cap member 26, a body 40 with longitudinal convex ridges 41 along its opposite lateral edges, another body member 50 with concave longitudinal grooves 51 along opposite lateral edges, and a larger cap member 30 are shown in exploded relation to illustrate the respective configurations as well as those features which comprise the interfitting or mating means whereby the respective structural members can be laminated together into unitary relation for added structural strength.

The body member 40 has a convex ridge 41 extending longitudinally on each lateral side of the body member and two elongated rectilinear tongues or ribs 42 protruding upwardly, each having a flat upper surface 48 and respective parallel inside faces 44 in spaced-apart relation to each other forming a channel 43 between said spaced-apart inside faces 44. The body member 40 also has two elongated rectilinear ribs 45 protruding downwardly with flat lower surfaces 49 and parallel inside faces 47 in spaced-apart relation to each other forming a channel 46 therebetween. Each upper rib 48 also has an outside face 44′, and each lower rib has an outside face 47′. The channels 43 and 46 are of equal width and depth and the inside faces 44 lay in the same respective planes as the inside faces 47. Also, the widths of ribs 42 and 49 are all equal so that the outside faces 44′ and 47′ on each side of the body member 40 lie in respective common planes.

The body member 50 has lateral sides with longitudinal concave grooves 51, upwardly directed lips or ribs 52 and downwardly directed lips or ribs 55. The upwardly directed lips 52 define a common channel 53 therebetween with inside faces 54 in parallel spaced-apart relation to each other. Likewise, the downwardly directed lips 55 define a common channel 56 therebetween with inside faces 57 in parallel spaced-apart relation to each other. The inside faces 54 and 57 on each side of the body member 50 lie in common respective planes. Also, the spacing between the inside faces 54 and the inside faces 57 approximately the distances between the outside faces 44′ and 47′, respectively, of body member 40.

It can thus be appreciated that body member 40 can be laminated together in interfitting, material relationship with body member 50 such as by inserting ribs 45 of body member 40 between lips 52 of body member 50. The thickness of ribs 42 and 45 is approximately equal to the depth of channels 53 and 56 so that when body members 40 and 50 are laminated together as described above, the flat surfaces 49 contact the flat surface of channel 53 and the outside faces 47′ contact the inside faces 54. It can thus be appreciated that body members 40 and 50 can be securely retained together for example by gluing these contacting surfaces of the respective body members together or by nailing or screwing in a conventional manner.

FIG. 2 also shows a cross-sectional view of an elongated cap member 26 disposed directly above the convex ribbed body member 40. The cap member 26 has a flat underside 28, parallel spaced-apart lateral surfaces 27 which are oriented perpendicular to the flat underside 28, and a contoured upper surface 29 of a generally flattened V-shaped cross-section. The overall width of the cap member 26, i.e., the distance between lateral surfaces 27, corresponds to the distance between inside faces 44 of body member 40. It can thus be appreciated that the cap member 26 is sized to be received within the channel 43 to conceal the interfitting means of body member 40 and to provide a contoured, finished appearance for the upper surface of a rail constructed with a body member 40. Cap member 26 can be permanently retained in channel 43 with appropriate fasteners, such as glue, nails, or screws.

A larger cap member 30 is also shown in cross-section in FIG. 2 with a flat underside 32 and perpendicularly disposed lateral surfaces 31, as well as a larger contoured surface 33 of generally V-shaped configuration. The distance between lateral surfaces 31 corresponds with the distance between inside faces 57 of the concave grooved body member 50. Thus, as seen from FIG. 2, the larger cap member 30 can be received within the channel 56 of body member 50 to conceal the interfitting means and to provide a contoured, finished appearance. Cap member 30 can also be permanently fixed in channel 56 with glue, nails, screws and the like.

The perspective view of FIG. 3 illustrates the body members 40 and 50 and the cap members 26 and 30 in assembled, laminated relation to each other. The view in FIG. 3 shows these members assembled in a finished molding with a pleasing architectural appearance on the lateral sides with comfortable, contoured upper and lower surfaces. It is also noted that in this embodiment, the thickness of the lateral surfaces 27 of cap member 26 exceeds the depth of channel 43 leaving a portion of the lateral surfaces 27 exposed to impart an additional architectural break as a feature in the appearance of the finished molding as indicated at 61. A similar break in the contoured surface for aesthetic purposes is provided in this embodiment by the lateral surfaces 31 of the larger cap member 30 being somewhat thicker than the depth of channel 56 in body member 50 as shown at 62.

The perspective view in FIG. 4 discloses another variation in the arrangement of the body and cap members to provide a somewhat thicker handrail with a different architectural appearance on the lateral sides of the molding. In this view, a body member 40 which the longitudinal convex ridges 41 and extending ribs 48, 49 is sandwiched between two body members 50 with the longitudinal concave grooves 51 and extending lips 52, 55. Two larger cap members 30 are used in this configuration, one to provide a contoured surface on the upper side of the finished molding and the other to provide a contoured surface on the lower side of the finished molding. This view also illustrates an additional variation in the cap members 30 which are still generally thicker than the depth of the channels 53 and 56 of body members 50; however, the outer portions of lateral surfaces 31 are rounded as indicated at 63 to eliminate the sharpness which was apparent in the embodiment shown in FIG. 3 at 61 and 62.

FIG. 5 illustrates an arrangement similar to that shown in FIG. 4 with a body member 40 with longitudinal convex ridges sandwiched between two body members 50 with longitudinal concave grooves. This configuration, however, also illustrates another variation in providing a finished appearance by inserting a flat surfaced fillet 34 into the channel 56 of the lower body member 50. As can be seen in FIG. 5, the fillet 34 completely fills the channels 56 providing a flat, finished appearance for the underside of the molding. This configuration is particularly appropriate for use as a handrail wherein the mounting bracket may require a flat undersurface on the rail for fastening. The filler 34 can be permanently retained in place by nails, screws or glue.

The configuration in FIG. 5 also shows another variation in the larger cap member 30. In this variation the lateral surfaces 31 are of the same thickness as the depth of channel 53 in the upper body member 50, resulting in a continuously smooth joint between the lips 52 of body member 50 and the contoured surface 33 of cap member 30 as indicated at 64.

FIG. 6 illustrates a perspective view of the concave lipped body member 50 in overlaying, interfacing relation to convex ribbed body member 40. A large contoured cap member 30 is also shown in this arrangement to provide a finished top surface as well as illustrating the upper end 17 of a supporting baluster 16 matingly received within the channel 46. Further, FIG. 6 illustrates another form of convex ribbed body member 40 having rounded external edges on the ribs 48, 49 as indicated at 66 for a smoother appearance and feel.

The perspective view in FIG. 7 indicates still another variation in combining two similar convex ribbed body members 40 in adjacent laminar relationship resulting in a somewhat different architectural appearance of the sides of the finished moldings. When two convex ribbed body members 40 are laminated together in the manner shown in FIG. 6, the thicker fillet 37 with a rectangular cross-sectional configuration serves as a key to provide a mating engagement between the like interfitting means of two body members 40. In this combination, the key fillet 37 has a thickness which approximates the sum of the depths of the respective channels 43 and 46 in adjacent body members 40 to substantially fill the interstice between the two body members. It can be appreciated that this same principle can also be applied to interfittingly stack two concave lipped body members 50 in adjacent laminar fashion if so desired. This combination is also shown with smaller cap member 26 with lateral surfaces 27 of equal thickness to the depth of channel 43 of the upper body member 40 to provide a continuous joint between the flat surface 48 of rib 42 and the contoured surface 29 of cap member 26 as indicated at 65.

The views in FIGS. 1, 6, and 7 considered together are instructive on methods and configurations which are appropriate for constructing a balustrade. FIGS. 6 and 7 illustrates how a baluster 16 with an upper top portion 17 of substantially square crosss-sectional configuration can be matingly joined with a convex ribbed body member 40 by inserting the top portion 17 into the channel 46 of body member 40. Referring again to FIG. 1, the lower and middle moldings 24 and 22 respectively, are each comprised substantially of a single concave lipped body member 50. The upper molding or railing is comprised of substantially a single body member 50 with a larger cap member 30 to provide a contoured upper surface. On the lower end, the lower portions 15 of balusters 12 are interfittingly engaged with the body member 50 by insertion into channel 53. The upper portions 13 of balusters 12 are likewise matingly engaged with the body member 50 of middle molding 22 by insertion into the channel 56. The shorter balusters 16 are similarly matingly engaged with the middle railing 22 and the upper railing 20 by inserting the lower portions 19 and upper portions 17 into the respective channels of the respective body members 50.

Then, both to provide additional structural integrity as well as interfitting engagement between the balusters and the moldings and to provide a pleasing, finished appearance concealing the interfitting means of the body member, fillets 34 are placed in the channels 53 and 56 of body member 50. It can be appreciated that when all of these elements are fastened together such as by nailing, screwing, or gluing, a relatively strong balustrade with a pleasing appearance can be constructed. It can also be appreciated that one can use his individual creativity to assemble railings and moldings of various sizes and configurations as already discussed, as well as numerous other variations which have not been discussed but which are implicit in this invention.

Although it is recognized that the main body members could be fabricated with virtually an infinite number of sizes and side configurations, the longitudinal convex ridge 41 of body member 40 and the longitudinal concave grooves 51 of body member 50 have been illustrated in this preferred embodiment because they have been found to be particularly appropriate for use in hand rails and balustrades. Two adjacent convex ridges 41 as illustrated in FIG. 7 or any combination of concave grooves 51 alone or in combination with convex ridges 41 as illustrated in FIGS. 1, 3, 4, 5, and 6, have been found to be especially appropriate and comfortable for use in handrails where the ends of a person's fingers grasp the resulting contours of the lateral sides of the moldings. The contoured cap members 26 and 30 with flattened V-shaped cross-sectional configurations have also been found to be particularly appropriate for use in handrails since they provide a confortable fit for the palm of a person's hand.

An alternative embodiment is illustrated in FIG. 8 wherein the same general side configurations for main body members are used but in which a variation in the interfitting means is used. A body member 70 with a longitudinal convex ridge 71 along its lateral sides with extending ribs 72 is shown in the lower laminated position in a molding. A body member 80 with longitudinal concave grooves 81 and extending lips or ribs 82 is shown in the upper laminated position in this molding configuration. The convex ribber body member 70 is also provided with channels 73, inside faces 74, and outside faces 75. The convex ribbed body member 80 is also provided with channels 83 and inside faces 84.

As described in the preferred embodiment, these respective features are sized and spaced for interfitting, mating engagement with one another, except that in this embodiment, the outside and inside faces 75, 74, and 84, respectively, rather than laying in common planes, are slanted at acute angles with respect to the channels 73 and 83. Accordingly, the body members are matingly engaged in laminar fashion by sliding the respective interfitting means together in longitudinal fashion. The actual process of laminating the body members together is therefore not as easy and quick as described in the preferred embodiment; however, once these body members are interfitted together as shown in FIG. 8, the engagement is more positive with resultant increased structural integrity.

Also, as shown in FIG. 7, the cap member 90 with contoured surface 91 in the form of a flattened V-shaped cross-section is also provided with lateral surfaces 93 disposed at an acute angle to the underside 92 to correspond to the acute angles of the interfitting means of concave lipped body member 80. Fillet 95 is similarly provided with lateral surfaces 97 at acute angles to the underside 96 corresponding to the acute angles of the interfitting means of convex ribbed body member 70.

Although the present invention has been described with a certain degree of particularity, it is understood that the present disclosure has been made by way of example and that changes in details and structure may be made without departing from the spirit thereof.

What is claimed is:

1. In a composite molding,
    a plurality of interchangeable elongated body members of selected geometric shapes and scale dimensions laminated together, each member including a distinctive ornamental lateral edge, and interfitting means on both its upper and lower surfaces for mating engagement between adjacent body members defined by complementary laterally spaced pairs of ribs disposed in mutually confronting relation to one another with channels between respective pairs of said ribs, wherein said ribs on one body member are received within the channel in an adjacent body member to inhibit lateral movement of one body member in relation to the other,
    an elongated cap member retained within and partially concealed by said interfitting means of one of said body members; and
    fastening means for securing said elongated body members and elongated cap in laminar relation to one another whereby to form an assembly having the external appearance and characteristics of an ornamental and functional unitary molding.

2. In the composite molding described in claim 1, wherein said body members are of two distinct configurations, the first configuration including ornamental edges with elongated, convex lateral edges, and said respective ribs on said first configuration being in the form of rectilinear tongues depending from both the upper and lower surface areas of said body members, each pair defining a channel between the inside surfaces of said tongues on a common surface of said body member, and the second configuration including ornamental edges with elongated, concave grooves along opposed lateral edges and said respective ribs of said second configuration which depend from a common surface area having inside surface portions in laterally spaced-apart relationship, said spaced-apart inside surface portions being a distance apart approximately equal to the distance between the outside surface portions of said rectilinear tongues depending from a common surface of a body member with said first configuration, whereby a body member with said first configuration is matingly engageable with a body member with said second configuration by inserting said tongues in said first configuration into said channel in said second configuration with said outside surface portions of said tongues in engaging contact with said inside surface portions of said ribs of said ornamental edges of said second configuration.

3. In the composite molding described in claim 2, wherein the external edges of any of said body members and cap members are rounded to provide a smooth contoured external surface for comfortable grasp by a person's hand.

4. In a molding construction set, comprising:
    a plurality of elongated structural members laminated together and selected from a group consisting essentially of a first configuration and a second configuration, said first configuration comprising a main first body portion with ornamental edges and rectilinear ribs extending in spaced relation from both the top surface and the bottom surface, there being one of said ribs adjacent each decorative edge on said top surface and one of said ribs adjacent each decorative edge on said bottom surface such that the combination of the inside faces of said ribs extending from said top surface and the middle portion of said top surface define an elongated top channel, and the combination of the inside faces of said ribs extending from said bottom surface and the middle portion of said bottom surface define an elongated bottom channel, and
    said second configuration comprising a main second body portion with ornamental edges being thicker than said main second body portion with a segment of each ornamental edge extending above and another segment extending below said main second body portion such that the combination of the inside faces of said segments and said main second body portion define a channel on top and a channel on the bottom of said main second body portion, the width of said channels in said second main body portion being approximately equal to the distance between the outside faces of said ribs of said first configuration whereby said first configuration is interengageable with said second configuration by insertion of said ribs on said first configuration into a channel in said second configuration.

5. The molding construction set of claim 4, including an elongated cap member with a contoured, ornamental top surface, a flat bottom surface, and a width equal to the width of a channel in a said structural member, whereby said cap member is insertable into said channel of the uppermost structural member in a molding to conceal said channel and to provide a contoured finish for comfortable feel and appearance for the top surface of said molding.

6. The molding construction set of claim 4, including an elongated fillet member with a substantially rectangular cross-section and with a width equal to the width of a channel in a said structural member and a thickness equal to the depth of said channel, whereby said fillet member is insertable into said channel to conceal said channel and to provide a flat, finished surface appearance for said molding.

7. The molding construction set of claim 4, including an elongated key member with a substantially rectangular cross-section and a width equal to the width of a channel in a said structural member and a thickness greater than the depth of said channel such that said key member is insertable into said channel and the extra increment of said thickness is receivable into a channel of another structural member, whereby two of said structural members can be interengaged together with said key member.

8. The molding construction set of claim 4, including a baluster, the end portion of said baluster having a thickness equal to the width of a channel in one of said structural members, whereby said end portion is receivable into said channel to interengageably connect said baluster to said structural member.

9. The molding construction set of claim 4, wherein each of said ornamental edges of said first configuration includes a convex ridge and each of said ornamental edges of said second configuration includes a concave groove extending along the length of said respective structural member to provide a gripping surface for the grasp of a person's fingers when said molding is used as a balustrade as well as to enhance the appearance of said molding.

10. The molding construction set of claim 4, wherein the inside lateral faces of said extending segments of said second configuration and both the inside and outside faces of said ribs of said first configuration are slanted in respectively corresponding acute angles to the upper and lower body surfaces whereby said first configuration is more positively interengageable with said second configuration by longitudinal sliding insertion of said ribs on said first configuration into a channel in said second configuration.

11. The molding construction set of claim 10, including an elongated cap member with a contoured ornamental top surface, a flat bottom surface, and a width equal to the width of a channel in a said structural member, the side faces of said cap member being oriented at an acute angle to said bottom surface corresponding with the acute angles of said respective inside and outside faces of said extending segments and ribs, whereby said cap member is longitudinally slidable into a channel in interfitting engagement with a structural member in a molding to conceal said channel and to provide a contoured finish for comfort and appearance of said molding.

12. The molding construction set of claim 10, including an elongated fillet member with a trapezoidal cross-section having flat upper and lower surfaces and side faces slanting at acute angles to said flat surfaces corresponding to the acute angles of said respective inside and outside faces of said extending segments and ribs, the width of the widest flat surface being approximately equal to the width of a channel in a said structural member, whereby said fillet member is longitudinally slidable into said channel in interfitting engagement with a structural member in a molding to conceal said channel and to provide a flat finished surface for appearance and to accommodate attachment of said molding to supports.

* * * * *